United States Patent
Jamshidi et al.

(10) Patent No.: US 9,106,507 B1
(45) Date of Patent: Aug. 11, 2015

(54) SELECTIVE PACKET VOICE TRIGGER USE IN A WIRELESS COMMUNICATION NETWORK

(75) Inventors: Talat Jamshidi, Leawood, KS (US); Jay Douglas Cole, Overland Park, KS (US); Wen Xue, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 609 days.

(21) Appl. No.: 13/155,488

(22) Filed: Jun. 8, 2011

(51) Int. Cl.
*H04L 12/701* (2013.01)
*H04L 12/801* (2013.01)
*H04L 29/06* (2006.01)

(52) U.S. Cl.
CPC ............ *H04L 45/00* (2013.01); *H04L 29/0653* (2013.01)

(58) Field of Classification Search
CPC ...... H04L 45/00; H04L 47/10; H04L 29/0653
USPC .................................................. 370/389, 392
See application file for complete search history.

(56) References Cited

U.S. PATENT DOCUMENTS

| | | | |
|---|---|---|---|
| 6,374,112 B1* | 4/2002 | Widegren et al. ........... | 455/452.2 |
| 7,359,771 B2 | 4/2008 | Soulie et al. | |
| 2001/0004595 A1* | 6/2001 | Dent ............................ | 455/435 |
| 2002/0094822 A1* | 7/2002 | Anctil et al. ................... | 455/456 |
| 2002/0094824 A1* | 7/2002 | Kennedy et al. ............... | 455/456 |
| 2003/0120750 A1* | 6/2003 | Gaxiola et al. ................ | 709/219 |
| 2005/0037755 A1* | 2/2005 | Hind et al. ................... | 455/435.3 |
| 2005/0083899 A1* | 4/2005 | Babbar et al. .................. | 370/342 |
| 2005/0260973 A1* | 11/2005 | van de Groenendaal ..... | 455/411 |
| 2007/0248079 A1 | 10/2007 | Jayaram et al. | |
| 2008/0176552 A1* | 7/2008 | Hamano et al. ............. | 455/422.1 |
| 2008/0273682 A1* | 11/2008 | Bakker et al. ............ | 379/201.12 |
| 2008/0285508 A1* | 11/2008 | Low et al. ...................... | 370/329 |
| 2009/0282251 A1* | 11/2009 | Cook et al. .................... | 713/171 |
| 2009/0323636 A1 | 12/2009 | Dillon et al. | |
| 2010/0080555 A1 | 4/2010 | Xu et al. | |
| 2011/0211439 A1* | 9/2011 | Manpuria et al. ............. | 370/216 |
| 2011/0292798 A1* | 12/2011 | Manpuria ..................... | 370/231 |
| 2012/0077488 A1* | 3/2012 | Unger et al. ............... | 455/432.1 |
| 2012/0134257 A1* | 5/2012 | Knox ............................. | 370/218 |
| 2012/0275375 A1* | 11/2012 | Liu et al. ....................... | 370/328 |

* cited by examiner

Primary Examiner — Ronald B Abelson

(57) ABSTRACT

Embodiments disclosed herein provide systems and methods for selective use of a packet voice trigger in a wireless access network. In a particular embodiment, a method provides receiving a call request for a call from a wireless device. The method further provides determining a location of the wireless device and processing an identifier for the wireless device to retrieve a device profile for the wireless device. If the device profile indicates that a trigger should be used for packet voice communications, then the method provides determining whether the trigger should be disarmed based on a quantity of the plurality of different access networks available to the wireless device at the location. If the trigger is armed, transfer the call request for delivery to the packet voice server to set up the call and, if not, process the call request in the wireless access network to set up the call.

16 Claims, 8 Drawing Sheets

| Available Access Networks for Wireless Device 301 | |
|---|---|
| BSID | Trigger Arm State |
| 1 | YES |
| 2 | YES |
| 3 | NO |
| 4 | YES |

FIGURE 7

SELECTIVE PACKET VOICE TRIGGER USE IN A WIRELESS COMMUNICATION NETWORK

TECHNICAL BACKGROUND

Packet communications are becoming the prevalent form of exchanging voice information between communication devices. In particular, wireless communication devices are now capable of exchanging voice information using wireless packet communications. Many of these wireless communication devices are capable of exchanging wireless packet communications over multiple different wireless communication networks. This ability to switch wireless communication networks adds complexity to the provision of packet voice services to wireless communication devices. As a remedy, voice communication servers have been deployed to manage packet voice services over multiple different wireless networks for a select set of the wireless communication devices.

When a packet voice service is configured for one of these select wireless communication devices, a voice server trigger is loaded into that wireless communication device's registration profile. When the wireless communication device registers with its wireless communication network, the trigger directs the wireless communication network to use a voice communication server for voice communications. In effect, the wireless communication network now becomes a simple transport path between the wireless communication device and the voice communication server for voice communications. Although the voice communication server manages packet voice services over multiple networks for the select wireless communication device, the addition of the voice communication server also creates an ancillary overhead and messaging load on the wireless communication network.

Overview

Embodiments disclosed herein provide systems and methods for selective use of a packet voice trigger in a wireless access network, wherein the wireless access network comprises one of a plurality of different wireless access networks and wherein a packet voice server interoperates with the plurality of different wireless access networks. In a particular embodiment, a method provides receiving a call request for a call from a wireless communication device that is capable of exchanging packet voice communications over the different access networks. The method further provides determining a geographic location of the wireless communication device and processing an identifier for the wireless communication device to retrieve a device profile for the wireless communication device. If the device profile indicates that the wireless communication device should use a trigger for packet voice communications to be serviced through the packet voice server, then the method provides determining whether the trigger should be disarmed based on a quantity of the plurality of different access networks available to the wireless communication device at the geographic location of the wireless communication device. If the trigger is armed, the method provides transferring the call request for delivery to the packet voice server to set up the call. If the trigger is disarmed, the method provides processing the call request in the wireless access network to set up the call.

BRIEF DESCRIPTION OF THE DRAWINGS

FIG. 7 illustrates a table for use in the operation of the wireless communication system for selective use of a packet voice trigger.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
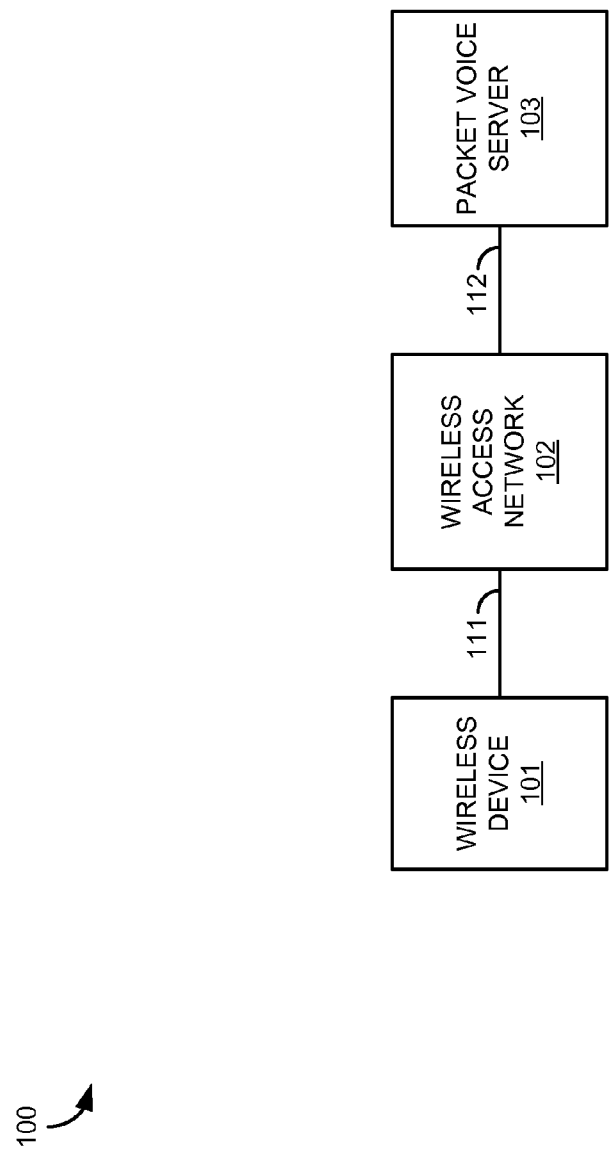
FIG. 1 illustrates a wireless communication system for selective use of a packet voice trigger.

FIG. 1 illustrates wireless communication system 100 for selective use of a packet voice trigger. Wireless communication system 100 includes wireless communication device 101, wireless access network 102, and packet voice server 103. Wireless communication device 101 and wireless access network 102 communicate over wireless link 111. Wireless access network 102 and packet voice server 103 communicate over communication link 112.

In operation, wireless device 101 is capable of exchanging packet voice communications with other systems or devices. Packet voice server 103 provides packet voice services to wireless device 101 through access network 102. A packet call from wireless device 101 is routed through packet voice server 103 if wireless device 101 is associated with the service provided by packet voice server 103. For example, a user of wireless device 101 may be a subscriber of a service provided by packet voice server 103. If wireless device 101 were to switch wireless access networks from wireless network 102 to another wireless access network during a packet voice call, then the call would continue to be serviced by packet voice server 103 via that other wireless access network. Hence, call continuity through packet voice server 103 is maintained even when wireless device 101 changes access networks.

Figure 2:
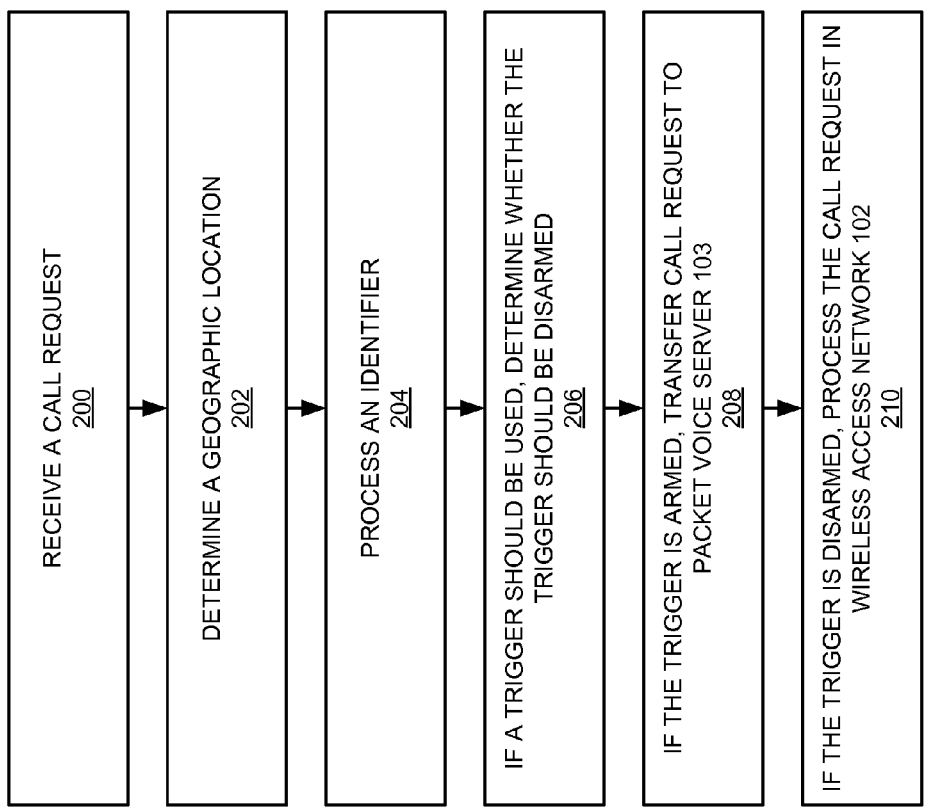
FIG. 2 illustrates the operation of the wireless communication system for selective use of a packet voice trigger.

FIG. 2 illustrates the operation of wireless communication system 100 for selective use of a packet voice trigger. The operation begins with wireless access network 102 receiving a call request for a call from wireless device 101 that is capable of exchanging packet voice communications over different access networks (step 200). Additionally, wireless access network 102 determines a geographic location of wireless device (step 202). The geographic location may be determined upon receipt of the call request or may be determined at some other time, such as when wireless device 101 registers with an access node. The geographic location may be determined based on global positioning coordinates, the location of an access node communicating with wireless device 101, the location of a mobile switching center (MSC) communicating with wireless device 101, or any other way of determining a geographic location for a wireless device.

Wireless access network 102 further processes an identifier for wireless device 101 to retrieve a device profile for wireless device 101 (step 204). As with the geographic location, the device identifier may be processed upon receipt of the call request or at some other time, such as when wireless device registers with wireless access network 102 or an access node of wireless access network 102. The device profile contains an indicator of whether packet calls from wireless device 101 should use a trigger for packet voice communications to be serviced through packet voice server 103. If the trigger is armed, then the trigger indicates to wireless network 102 that packet voice calls from wireless device 101 should be service through packet voice server 103. If the trigger is disarmed, then the trigger indicates to wireless network 102 that packet voice calls from wireless device 101 should be serviced by wireless network 102.

The device profile may further contain information about wireless device 101 or a user of wireless device 101, such as billing information, rate plan information, network preferences information, or any other type of information that wireless access network 102 may need when providing network access service to wireless device 101.

If the device profile indicates that wireless device 101 should use a trigger, then wireless access network 102 determines whether the trigger should be disarmed based on a quantity of the plurality of different access networks available to wireless device 101 at the geographic location of the wireless device 101 (Step 206). In general, if wireless device 101 can communicate with wireless access networks other than wireless access network 102 in the geographic location, then wireless access network 102 will determine that the trigger should remain armed. The trigger should remain armed in this situation because wireless device 101 has the possibility of switching to exchange packets with at least one other wireless access network.

However, if wireless access network 102 is the only access network available to wireless device 101 at the geographic location, then wireless access network 102 will determine that the trigger should be disarmed. If there is little or no possibility that wireless device 101 will switch to using a wireless access network other than wireless access network 102, then wireless access network 102 will handle the packet voice call itself. The trigger may also be disarmed when other wireless access networks may be available to wireless device 101 but are unable to exchange packet voice communications.

Wireless access network 102 may reference a data structure, such as a table, when determining whether to disarm the trigger. For example, the data structure may indicate locations where a trigger should or should not be used when servicing a call from wireless device 101. The locations may apply to any wireless device or may be specific to wireless device 101. For example, wireless device 101 may be able to communicate with a wireless access network with which another wireless device is unable to communicate. Thus, the quantity of different access networks that can be accessed by wireless device 101 in a particular location may be different than for another wireless device.

The data structure may be updated from information from the phone or from some other source to provide accurate information about wireless access networks available to wireless device 101 at various locations. For example, wireless device 101 may transfer update information indicating what networks, such as Wi-Fi, CDMA, WiMAX, and LTE, are available to wireless device 101 at various geographic locations.

After making the trigger arming determination, if the trigger is armed, wireless access network 102 transfers the call request for delivery to packet voice server 103 to set up the call (step 208). Once the call is set up by packet voice server 103, if wireless device 101 were to switch wireless access networks from wireless access network 102 during the call, then packet voice server 103 would continue to service the call through that other wireless access network. Thus, call continuity is maintained during the wireless access network switch.

Alternatively, if the trigger is disarmed, then the call request is processed in wireless access network 102 to set up the call (step 210). Packet voice server 103 is not needed in situations where the trigger is disarmed because wireless device 101 is unable to switch to a different wireless access network at the geographic location. Therefore, call continuity can be maintained without the need for an independent packet voice server.

Referring back to FIG. 1, wireless communication device 101 comprises Radio Frequency (RF) communication circuitry and an antenna. The RF communication circuitry typically includes an amplifier, filter, modulator, and signal processing circuitry. Wireless communication device 101 may also include a user interface, memory device, software, processing circuitry, or some other communication components. Wireless communication device 101 may be a telephone, computer, e-book, mobile Internet appliance, wireless network interface card, media player, game console, or some other wireless communication apparatus—including combinations thereof.

Wireless access network 102 comprises network elements that provide wireless devices with wireless communication access to packet communication services. Wireless network 102 may comprise switches, wireless access nodes, Internet routers, network gateways, application servers, computer systems, communication links, or some other type of communication equipment—including combinations thereof.

Packet voice server 103 comprises a computer system and communication interface. Packet voice server 103 may also include other components such a router, server, data storage system, and power supply. Packet voice server 103 may reside in a single device or may be distributed across multiple devices. Packet voice server 103 is shown externally to wireless access network 102, but server 103 could be integrated within the components of wireless access network 102 while still providing call continuity with other access networks as discussed above. Packet voice server 103 could be a Voice Call Continuity (VCC) system or some other type of system for providing a packet voice service.

Wireless link 111 uses the air or space as the transport media. Wireless link 111 may use various protocols, such as Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other wireless communication format. Communication link 112 uses metal, glass, air, space, or some other material as the transport media. Communication link 112 could use various communication protocols, such as Time Division Multiplex (TDM), Internet Protocol (IP), Ethernet, communication signaling, CDMA, EVDO, WIMAX, GSM, LTE, WIFI, HSPA, or some other communication format—including combinations thereof. Communication link 112 could be a direct link or may include intermediate networks, systems, or devices.

Figure 3:
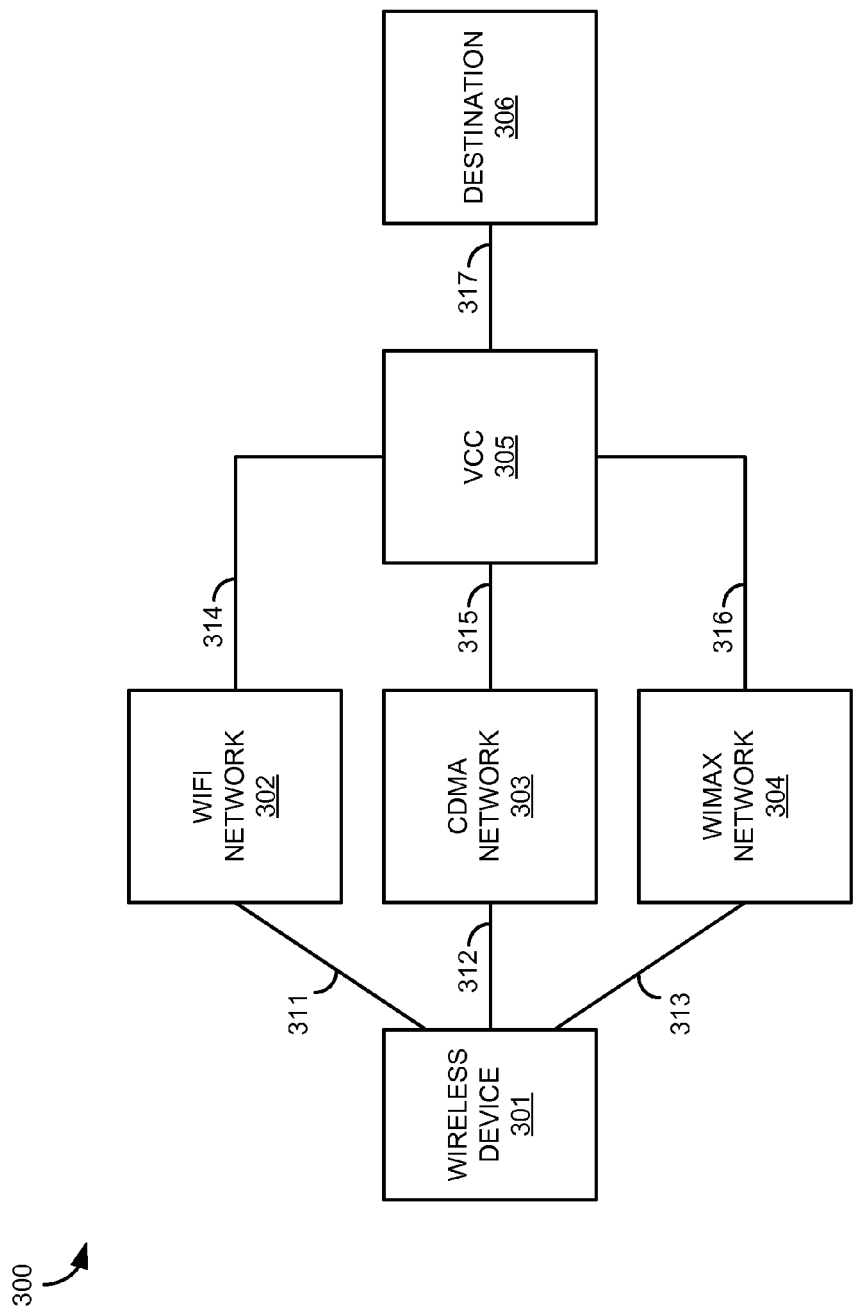
FIG. 3 illustrates a wireless communication system for selective use of a packet voice trigger.

FIG. 3 illustrates wireless communication system 300 for selective use of a packet voice trigger. Wireless communication system 300 includes wireless communication device 301, WIFI network 302, CDMA network 303, WIMAX network 304, Voice Call Continuity system (VCC) 305, and destination 306. Wireless communication device 301 and WIFI network 302 communicate over wireless link 311. Wireless communication device 301 and CDMA network 303 communicate over wireless link 312. Wireless communication device 301 and WIMAX network 304 communicate over wireless link 313. WIFI network 302 and VCC 305 communicate over communication link 314. CDMA network 303 and VCC 305 communicate over communication link 315. WIMAX network 304 and VCC 305 communicate over communication link 316. VCC 305 and destination 306 communicate over communication link 317.

Figure 4:
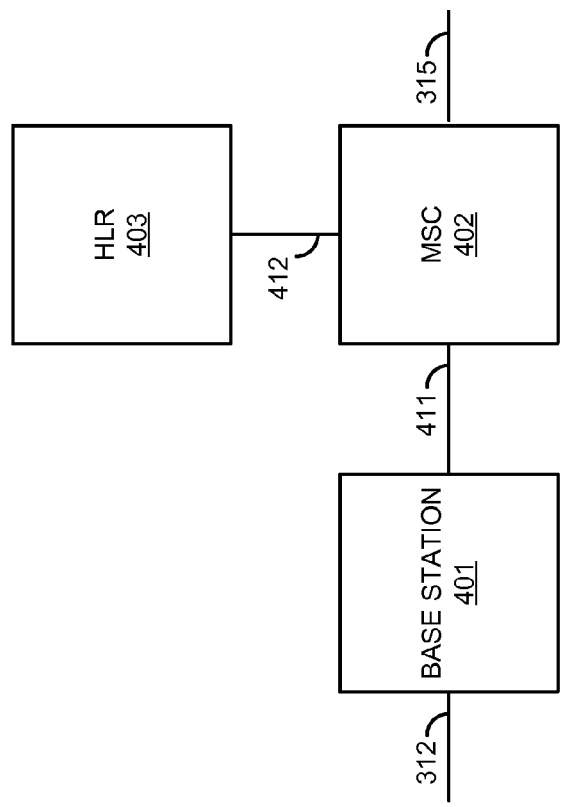
FIG. 4 illustrates a wireless communication network for selective use of a packet voice trigger.

FIG. 4 illustrates more detail of CDMA network 303. CDMA network 303 includes base station 401, Mobile Switching Center (MSC) 402, and Home Location Register (HLR) 403. Base station 401 and MSC 402 communicate over communication link 411. MSC 402 and HLR 402 communicate over communication link 412.

Figure 5:
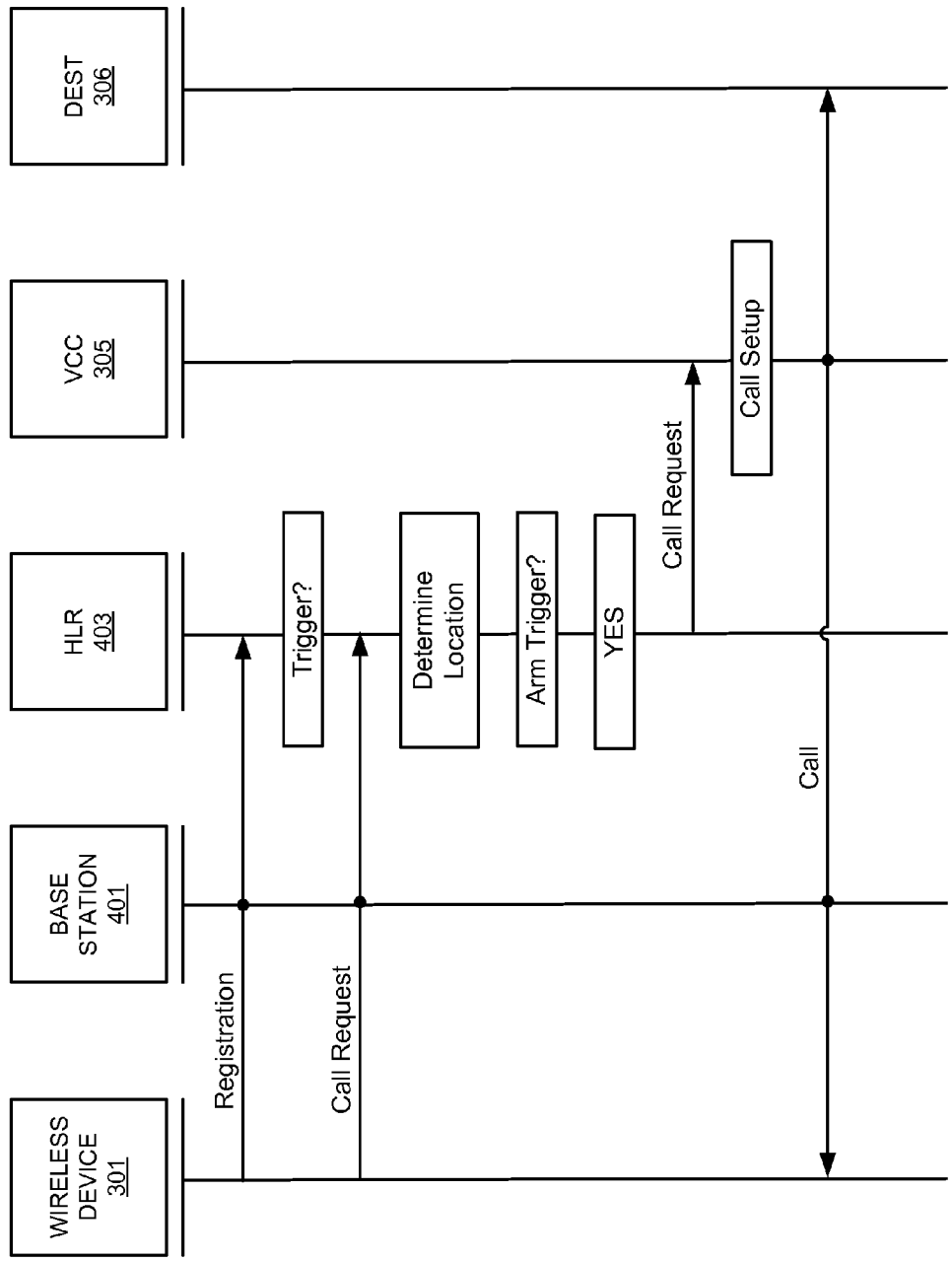
FIG. 5 illustrates the operation of the wireless communication system for selective use of a packet voice trigger.

FIG. 5 illustrates the operation of wireless communication system 300 for selective use of a packet voice trigger. In operation, wireless device 301 is capable of exchanging packet voice communications over each of networks 302-303. When wireless device 301 first powers on or becomes within wireless signal range of base station 401, wireless device 301 transfers a registration request to base station 301 in order to register with CDMA network 303. HLR 403 receives the registration request and processes the registration request to determine information regarding the provision of wireless service to wireless device 301 based on an identifier for wireless device 301 contained within the registration request. The information may be stored within HLR 403 or HLR 403 may retrieve the information from another system on CDMA network 303.

Specifically, HLR 403 determines from the information whether calls from wireless device 301 should use a trigger for packet voice services. This trigger may be a Wireless Intelligent Network (WIN) trigger, which is used to route communications through a WIN from a wireless access network. In this example, HLR 403 determines that a trigger should be used for communications from wireless device 301. If in other examples, the information indicated that calls from wireless device 301 should not use a trigger, then the call will be completed using CDMA network 303.

After registering with CDMA network 303, wireless device 301 transfers a call request to CDMA network 303. The call request indicates that wireless device 301 is requesting a packet call connection with destination 306. Upon receiving the call request, HLR 403 determines the location of wireless device 301. In this example, HLR 403 determines the location of wireless device 301 based on an identifier for base station 401. Also in this example, the base station identifier (BSID) for base station 403 is 1.

Using the BSID for base station 401, HLR 403 determines whether to arm the trigger for wireless device 301 based on table 700 shown in FIG. 7. Table 700 provides whether the trigger for wireless device 301 should be armed in locations served by various base stations. In this example, HLR 403 references table 700 to determine that, when wireless device 301 is at a location communicating with base station 401 having BSID 1, the trigger for wireless device 301 should remain armed. The table shows that the trigger should be armed in this location because at this location wireless device 301 is also capable of exchanging packet voice communications with WIFI network 302 and WIMAX network 304. Instead of showing a binary value (YES or NO) for the trigger arm states, table 700 may instead list the other networks available to wireless device 301 and allow HLR 403 to make the trigger arm state determination based on the quantity of networks available.

After determining that the trigger should remain armed, the call request is transferred to VCC 305. CDMA network 303 is configured to transfer call requests to VCC 305 from wireless devices with armed triggers. Thus, since HLR 403 determined that the trigger should remain armed, the call is forwarded to VCC 305 based on the trigger state.

Once the call request is received in VCC 305, VCC 305 sets up the packet voice call between wireless device 301 and destination 306 through CDMA network 303. This arraignment allows for VCC, which is independent of CDMA network 303, to continue servicing the call even if wireless device were to switch from communicating with CDMA network 303 to either of WIFI network 302 or WIMAX network 304.

Figure 6:
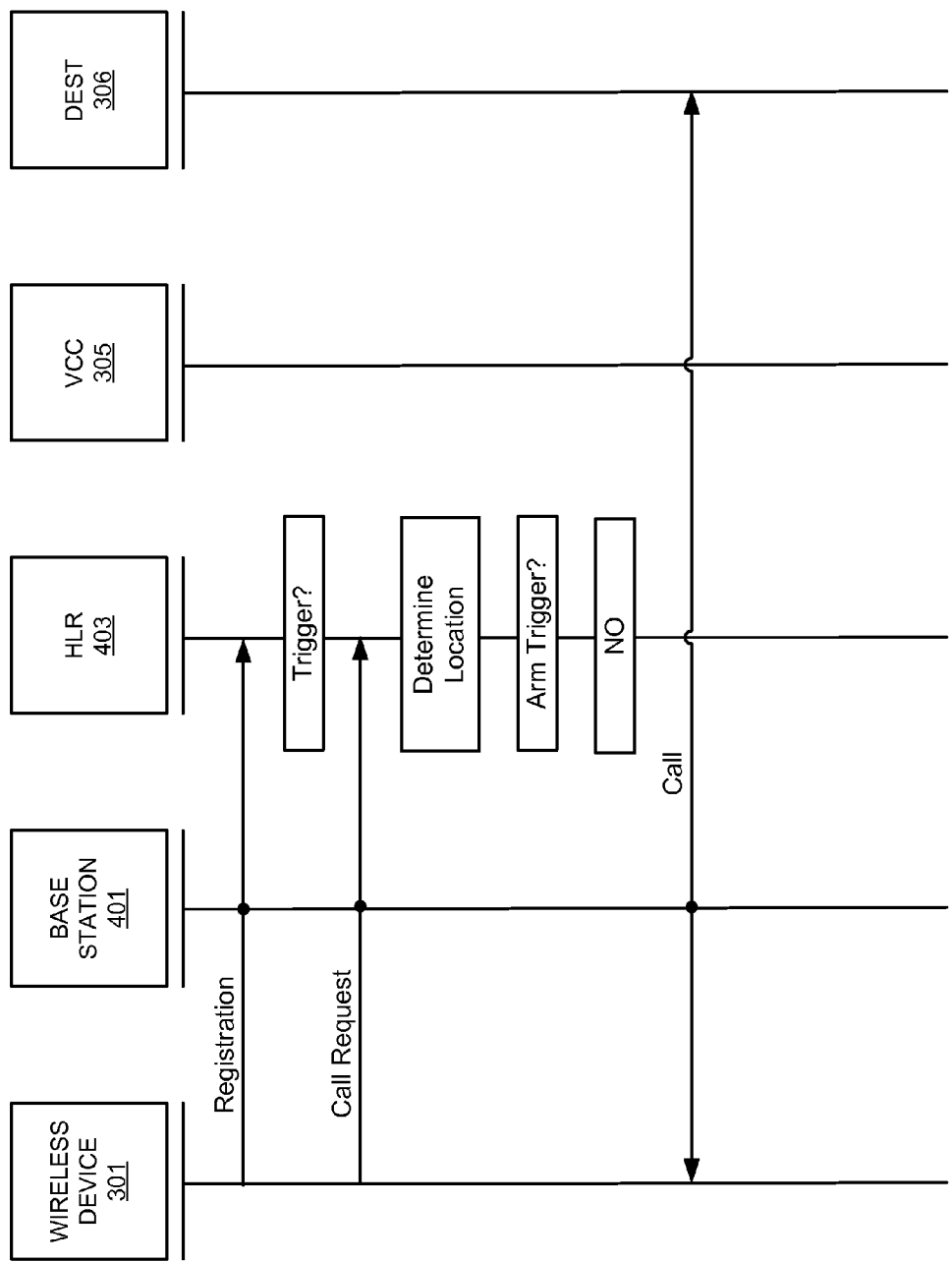
FIG. 6 illustrates the operation of the wireless communication system for selective use of a packet voice trigger.

FIG. 6 illustrates the operation of wireless communication system 300 for selective use of a packet voice trigger. In operation, wireless device 301 is capable of exchanging packet voice communications over each of networks 302-303. However, in this example unlike the previous example, wireless device 301 is unable to communicate with both WIFI network 302 and WIMAX network 304. This may be due to wireless device 301 being out of signal range of those two networks at the current geographic location of wireless device 301 or for some other reason that WIFI network 302 and WIMAX network 304 may be unavailable to wireless device 301.

When wireless device 301 first powers on or becomes within wireless signal range of base station 401, wireless device 301 transfers a registration request to base station 301 in order to register with CDMA network 303. HLR 403 receives the registration request and processes the registration request to determine information regarding the provision of wireless service to wireless device 301 based on an identifier for wireless device 301 contained within the registration request. The information may be stored within HLR 403 or HLR 403 may retrieve the information from another system on CDMA network 303.

As in the previous example, HLR 403 determines from the information whether calls from wireless device 301 should use a trigger for packet voice services. This trigger may be a Wireless Intelligent Network (WIN) trigger, which is used to route communications through a WIN from a wireless access network. In this example, HLR 403 once again determines that a trigger should be used for communications from wireless device 301.

After registering with CDMA network 303, wireless device 301 transfers a call request to CDMA network 303. The call request indicates that wireless device 301 is requesting a packet call connection with destination 306. Upon receiving the call request, HLR 403 determines the location of wireless device 301. In this example, HLR 403 determines the location of wireless device 301 based on an identifier for base station 401. Also in this example, the base station identifier (BSID) for base station 403 is 3.

Using the BSID for base station 401, HLR 403 determines whether to arm the trigger for wireless device 301 based on table 700 shown in FIG. 7. Table 700 provides whether the trigger for wireless device 301 should be armed in locations served by various base stations. In this example, HLR 403 references table 700 to determine that, when wireless device 301 is at a location communicating with base station 401 having BSID 3, the trigger for wireless device 301 should be disarmed. The table shows that the trigger should disarmed in this location because at this location wireless device 301 is not capable of exchanging packet voice communications with other wireless access networks.

After determining that the trigger should be disarmed, the call request is serviced by CDMA network 303 to set up the call with destination 306. Packet voice communications for the call are then exchanged between wireless device 301 and destination 306 via CDMA network 303 without going through VCC 305. In this situation, since wireless device 301 is unable to switch to other networks during the call, call continuity when switching networks is not a concern. Thus, VCC 305 is unnecessary for the call.

Figure 8:
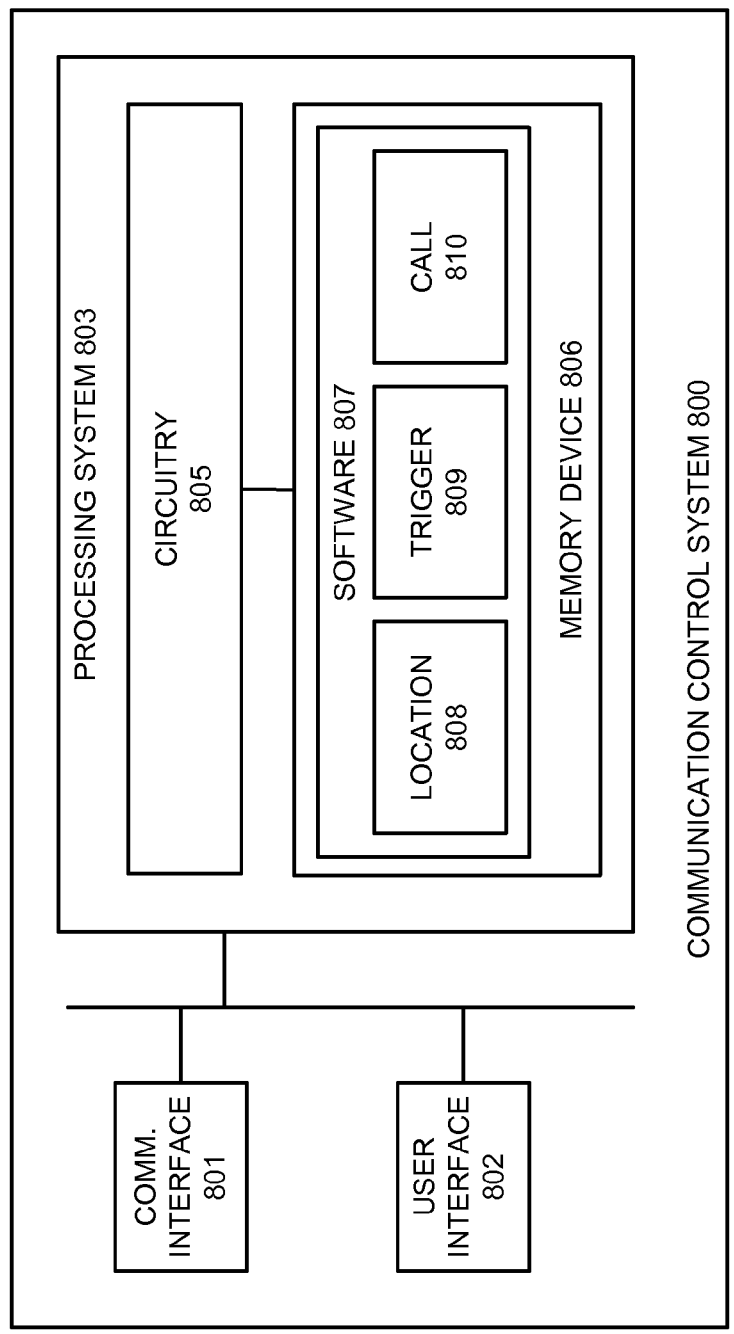
FIG. 8 illustrates a communication control system for selective use of a packet voice trigger.

FIG. 8 illustrates communication control system 800. Communication control system 800 is an example of a communication control system within wireless access network 102 or HLR 403, although the control system and HLR 403 may use alternative configurations. Communication control system 800 comprises communication interface 801, user interface 802, and processing system 803. Processing system 803 is linked to communication interface 801 and user interface 802. Processing system 803 includes processing circuitry 805 and memory device 806 that stores operating software 807.

Communication interface 801 comprises components that communicate over communication links, such as network cards, ports, RF transceivers, processing circuitry and software, or some other communication devices. Communication interface 801 may be configured to communicate over metallic, wireless, or optical links. Communication interface 801 may be configured to use TDM, IP, Ethernet, optical networking, wireless protocols, communication signaling, or some other communication format—including combinations thereof.

Communication interface 801 is configured to receive a call request for a call from a wireless communication device that is capable of exchanging packet voice communications over different access networks and, if a trigger is armed, transfer the call request for delivery to a packet voice server to set up the call.

User interface 802 comprises components that interact with a user. User interface 802 may include a keyboard, display screen, mouse, touch pad, or some other user input/output apparatus. User interface 802 may be omitted in some examples.

Processing circuitry 805 comprises microprocessor and other circuitry that retrieves and executes operating software 807 from memory device 806. Memory device 806 comprises a non-transitory storage medium, such as a disk drive, flash drive, data storage circuitry, or some other memory apparatus. Operating software 807 comprises computer programs, firmware, or some other form of machine-readable processing instructions. Operating software 807 includes location determination module 808, trigger arming module 809, and call processing module 810. Operating software 807 may further include an operating system, utilities, drivers, network interfaces, applications, or some other type of software. When executed by circuitry 805, operating software 807 directs processing system 803 to operate communication control system 800 as described herein.

In particular, location determination module 808 directs processing system 803 to determine a geographic location of the wireless communication device. Trigger arming module 809 directs processing system 803 to process an identifier for the wireless communication device to retrieve a device profile for the wireless communication device and, if the device profile indicates that the wireless communication device should use a trigger for packet voice communications to be serviced through the packet voice server, determining whether the trigger should be disarmed based on a quantity of the plurality of different access networks available to the wireless communication device at the geographic location of the wireless communication device. Call processing module directs processing system 803 to, if the trigger is disarmed, process the call request in a wireless access network to set up the call.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless access network, wherein the wireless access network comprises one of a plurality of different wireless access networks and wherein a packet voice server interoperates with the plurality of different wireless access networks, comprising:
    receiving a call request for a call from a wireless communication device that is capable of exchanging packet voice communications over different access networks;
    determining a geographic location of the wireless communication device;
    processing an identifier for the wireless communication device to retrieve a device profile for the wireless communication device;
    if the device profile indicates that the wireless communication device should use a trigger for packet voice communications to be serviced through the packet voice server, determining whether the trigger should be disarmed based on a quantity of the plurality of different access networks available to the wireless communication device at the geographic location of the wireless communication device, wherein the trigger is disarmed if there are no additional wireless access networks available to the wireless communication device at the geographic location based on a table that indicates a trigger disarmament state for the wireless communication device at the geographic location;
    if the trigger is armed, transferring the call request for delivery to the packet voice server to set up the call; and
    if the trigger is disarmed, processing the call request in the wireless access network to set up the call.

2. The method of claim 1 further comprising:
    receiving a registration request for the wireless communication device including the identifier; and
    wherein processing the identifier for the wireless communication device to retrieve the device profile for the wireless communication device is performed in response to the registration request.

3. The method of claim 1 wherein both processing the identifier for the wireless communication device to retrieve the device profile for the wireless communication device and the table is maintained within a Home Location Register (HLR) of the wireless access network.

4. The method of claim 1 further comprising:
    overriding the trigger disarmament state based on a setting in the wireless communication device.

5. The method of claim 4 wherein the setting is managed by a device connection manager of the wireless communication device.

6. The method of claim 1 wherein the geographic location is determined in a Home Location Register (HLR) of the wireless communication network.

7. The method of claim 1 wherein the geographic location is determined based on a Mobile Switching Center (MSC) serving the wireless communication device.

8. The method of claim 1 wherein the geographic location is determined based on a base station serving the wireless communication device.

9. A wireless access network of a plurality of different wireless access networks, wherein a packet voice server interoperates with the plurality of different wireless access networks, comprising:

a communication interface configured to receive a call request for a call from a wireless communication device that is capable of exchanging packet voice communications over different access networks;

a processing system configured to determine a geographic location of the wireless communication device, process an identifier for the wireless communication device to retrieve a device profile for the wireless communication device, and, if the device profile indicates that the wireless communication device should use a trigger for packet voice communications to be serviced through the packet voice server, determining whether the trigger should be disarmed based on a quantity of the plurality of different access networks available to the wireless communication device at the geographic location of the wireless communication device, wherein the trigger is disarmed if there are no additional wireless access networks available to the wireless communication device at the geographic location based on a table that indicates a trigger disarmament state for the wireless communication device at the geographic location;

the communication interface further configured to, if the trigger is armed, transfer the call request for delivery to the packet voice server to set up the call and, if the trigger is disarmed, processing the call request in the wireless access network to set up the call.

10. The wireless access network of claim 9 further comprising:

the communication interface further configured to receive a registration request for the wireless communication device including the identifier; and wherein processing the identifier for the wireless communication device to retrieve the device profile for the wireless communication device is performed in response to the registration request.

11. The wireless access network of claim 9 wherein the communication interface and the processing system are within a Home Location Register (HLR) of the wireless access network.

12. The wireless access network of claim 9 further comprising:

the wireless communication device configured to override the trigger disarmament state based on a setting in the wireless communication device.

13. The wireless access network of claim 12 wherein the setting is managed by a device connection manager of the wireless communication device.

14. The wireless access network of claim 9 wherein the geographic location is determined based on global positioning coordinates of the wireless device.

15. The wireless access network of claim 9 wherein the geographic location is determined based on a Mobile Switching Center (MSC) serving the wireless communication device.

16. The wireless access network of claim 9 wherein the geographic location is determined based on a base station serving the wireless communication device.

* * * * *